June 10, 1930.   C. E. MAYNARD   1,762,831
METHOD OF AND MOLD FOR SPLICING RUBBER TUBES
Filed April 16, 1927

INVENTOR.
Charles Edgar Maynard
BY
Edward C. Taylor
ATTORNEY.

Patented June 10, 1930

1,762,831

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

METHOD OF AND MOLD FOR SPLICING RUBBER TUBES

Application filed April 16, 1927. Serial No. 184,393.

This invention relates to a method of splicing rubber tubes and to a mold adapted for use in this method. The object of this invention is to improve old methods of splicing tubes and the apparatus used in these methods in respect to the speed with which the splicing operation can be performed, the perfection of the splice produced, and the simplicity of the apparatus necessary.

In the manufacture of inner tubes of automobile tire casings it is the common practice to make them upon a mandrel from which they are removed after vulcanization. The tube produced by this method is not endless as it must be when used as an inner tube. For this reason it is necessary to splice together the ends of the tube by an additional step of vulcanization, this additional vulcanization being generally of a layer of cement interposed between the overlapped ends of the tube rather than a substantial vulcanization of the tube rubber itself. The most common method of splicing has been to cuff the tube back upon a cylindrical mandrel and to bind this down upon the mandrel either by a wrapping of tape or by some contractible device such as an air bag. It has also been proposed to encircle the splice with an inextensible jacket and to cause the tube to expand into this jacket by means of pressure between two press platens one of which was curved. These methods have from their very nature been slow and have required many intermediate handling operations, such as the wrapping with tape or the application of the inextensible jacket, which consume time and do not advance the splice directly toward vulcanization.

According to my invention I have improved these prior methods by eliminating intermediate steps and by exerting splicing pressure upon the tube as soon as the splice has been formed. According to my method the splice is prepared with cement and joined together as in prior methods with the preferable exception that an extremely rapid accelerator is used in the cement in order to reduce the time of cure to such an extent that the already vulcanized material of the tube will not suffer any permanent set during the vulcanization of the splice. After the splice has been cemented and united it is subjected to a pressure serving to flatten it in one direction, the tube being pressed flat upon itself without the interposition of any mandrel whatever. The tube is then removed from the pressing means and preferably permitted to cool. It is then flattened in the opposite direction and again subjected to vulcanizing heat. This operation, however, is very short, being conveniently of the extent of about fifteen to thirty seconds for each pressing operation.

The invention will now be described in connection with the accompanying drawings, in which Fig. 1 is a detail of the splice prepared with cement, but before joining;

Figure 1:
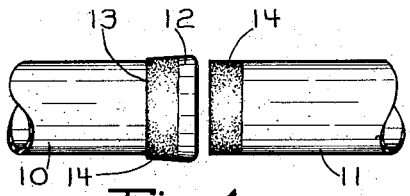
Figure 2:
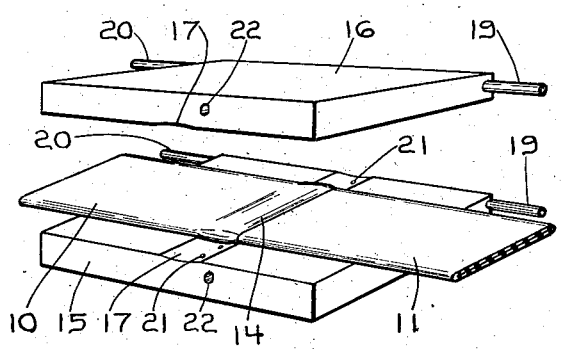
Fig. 2 is a perspective showing the splice in position in the vulcanizing mold before the mold is closed upon it.

In preparing the tube for splicing, the ends 10 and 11 of the rubber tube are treated substantially as in prior methods with the exception that the length of the splice may be reduced to a minimum. The end 10 is cuffed or folded back upon itself as at 12 and is skived as at 13. The end 11 may likewise be skived but the skiving may not be carried to the extent of that upon the end 10, which lies at the outside of the finished tube. To the folded back portion of the end 10 and to the edge of the end 11 is applied a layer of cement 14, preferably compounded with one of the modern high-powered accelerators which cause the compound to cure in a very short period of time. This cement is permitted to dry in the usual manner, the ends of the tube brought together, and the cuffed back portion 12 of end 10 folded over upon the end 11 as indicated in Fig. 2. The splice is now completed and is ready for vulcanization.

Figure 8:
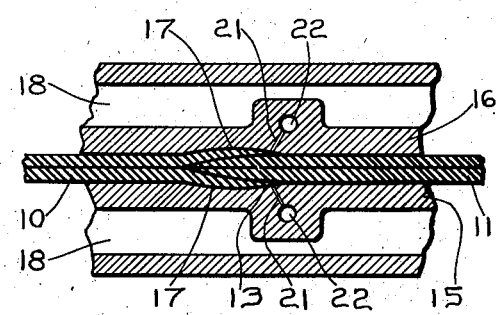
Fig. 8 is a sectional detail upon an enlarged scale taken on line 8—8 of Fig. 4.

According to my method I use a vulcanizing mold such as is shown in perspective in Fig. 2. This mold comprises a bottom section 15 and a top section 16, each of which has a substantially flat space carrying a groove 17 extending transversely across the mold from front to back. The mold may be heated by contact with a heated press platen or the heating may be by some self-contained system such as a steam chamber 18 having an inlet pipe 19 and an outlet pipe 20. Located adjacent one edge of the groove 17 in each section of the mold are vent holes 21 leading into a transverse hole 22. The location of these vent holes is such that, as shown in Fig. 8, any gas trapped in the splice may find access to the outer air.

Figure 3:
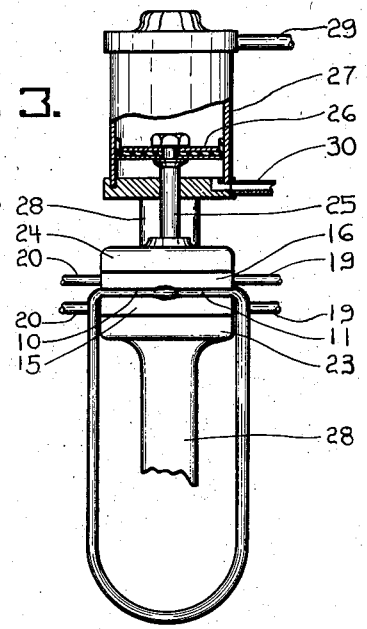
Fig. 3 is a front elevation, partly in section, of a conventional press adapted for the performance of my method.

I have shown in Fig. 3 a conventional type of press to which the mold sections 15 and 16 have been applied. This press comprises a bottom platen 23, which in the case shown is fixed; and a top platen 24, which is made movable by the means to be described. To the top platen is fixed a piston rod 25 secured to a piston 26 running in the cylinder 27, the cylinder being mounted in the same frame 28 which holds the bottom platen 23. Air pipes 29 and 30 lead respectively to the top and to the bottom of the cylinder 27 whereby by a suitable valve mechanism air may be admitted above the piston to force the top platen downwardly with a determined pressure (preferably an effective pressure on the splice of about 200 pounds per square inch) against the bottom platen, or air may be admitted under the piston to raise the top platen to an inoperative position.

Figure 5:
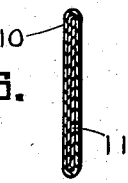
Fig. 5 is an intermediate position of the tube after removal from the mold.
Figure 6:
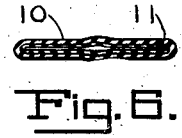
Fig. 6 illustrates the condition of the tube prior to the second pressing operation.

After the splice has been introduced between the two sections of the mold, as in Fig. 2, the mold sections are brought together as by the press mechanisms shown in Fig. 3. The grooves 17 relieve the pressure somewhat at the thickened portion of the splice so that there is not an undue amount of pressure at this point, and the flat part of the opposed mold surfaces firmly grip the two ends on each side of the splice so that there is no opportunity for the splice to slip apart endwise. The heat and pressure is continued for a period sufficient to set and at least partially vulcanize the cement, but not sufficient to give a permanent set to the already vulcanized tube rubber. After this period, which may be as short as fifteen seconds and is conveniently about thirty seconds, the tube is removed from between the mold sections and the flattened splice turned the other way as in Figs. 5 and 6. The portion of the splice at the edges during the first pressure will have been slightly creased, although not to any permanent degree, and the second pressing operation both removes the slight crease and gives a vulcanizing pressure at the edges in a manner which could not be done during the first operation.

Between the first and second pressing operations it is sometimes preferable to allow the tube to cool. The reason for this is that the permanent set given to the rubber depends upon the softness of the rubber at the time when the pressure is applied and this softness depends in turn upon the heat of the rubber. The intermediate cooling steps permit the rubber to regain its rigidity and to avoid the creation of a permanent set during the second pressing operation. A cooling period of five minutes will generally be found amply sufficient. It will be understood that in practice a large number of splicing units are employed simultaneously, one operator handling a large number of molds and keeping an even larger number of tubes continuously in process.

Figure 4:
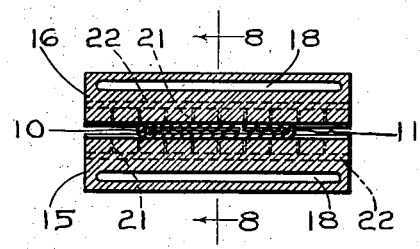
Fig. 4 is a transverse section through the splice and tube showing the tube in position in the vulcanizing mold.
Figure 7:
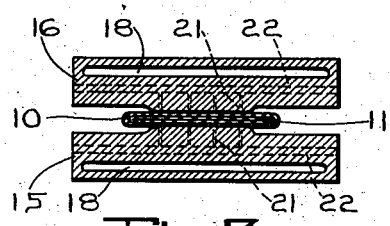
Fig. 7 is a view similar to Fig. 4 but illustrating a slightly different mold, such, for example, as may find use in the second pressing operation.

The mold shown in Fig. 4 is much wider than the flattened splice. The second operation can be performed in a mold of these same dimensions, but by the use of a mold having a narrower effective space, as shown in Fig. 7, any flattening of the edges will be avoided. If desired, both pressing operations can be given with a mold of the form of Fig. 7, but where a large variety of mold sizes are to be operated upon in one mold it is preferable to have the first mold wide enough to treat the widest tube that may be brought to it as in Fig. 4, and to correct any creasing by the second pressing operation as shown in Fig. 7. It is perfectly possible, moreover, to perform both pressing operations in the wide mold of Fig. 4, although the narrower mold is preferred for the second operation.

Having thus described my invention, I claim:

1. A method of vulcanizing the spliced ends of a rubber tube which comprises pressing the splice flat successively in two directions at right angles to each other.

2. A method of vulcanizing the spliced ends of a rubber tube which comprises flattening the splice under heat and pressure, removing the pressure and permitting the splice to cool, and flattening the splice under heat and pressure in a direction at right angles to the first.

3. A method of vulcanizing the spliced ends of a rubber tube which comprises flattening the splice upon itself while holding it against endwise movement, flattening the splice a second time in a direction at right angles to the first, and heating the splice during each pressing operation.

4. A method of vulcanizing the spliced ends of a rubber tube which comprises flattening the splice upon itself under heat and pressure, removing the pressure, and flattening the splice again upon itself in a direction at right angles to the first, the pressure in at least its second application extending only partially across the width of the splice.

5. A mold for vulcanizing the spliced ends of rubber tubes which comprises a pair of flat plates each having a splice receiving groove extending transversely across it, and one or more venting apertures located adjacent one edge of the groove in position to permit the expulsion of entrapped gas from the outer edge of the splice.

6. A mold for vulcanizing the spliced ends of rubber tubes which comprises a pair of flat plates having registering splice receiving grooves extending across their opposed faces, the edges of the plates parallel to the splice receiving grooves being free to permit the body of the tube to extend beyond the plates on either side of the splice.

7. A two-part mold for vulcanizing the spliced ends of rubber inner tubes each part of which has spaced substantially flat tube gripping surfaces and a splice receiving groove extending across said mold part between the gripping surfaces.

8. A mold for vulcanizing the spliced ends of rubber tubes comprising mating members defining a splice receiving cavity, and means for preventing longitudinal slipping of the tube ends when splicing pressure is applied.

CHARLES EDGAR MAYNARD.